US012422083B2

United States Patent
Haukom et al.

(10) Patent No.: US 12,422,083 B2
(45) Date of Patent: Sep. 23, 2025

(54) APPARATUS FOR PROPULSION AND OPERATIONS INSIDE A CYLINDRICAL BODY

(71) Applicant: Pipesnake AS, Evje (NO)

(72) Inventors: Ivar Haukom, Evje (NO); Trond Skagestad, Godvik (NO)

(73) Assignee: Pipesnake AS, Evje (NO)

( * ) Notice: Subject to any disclaimer, the term of this patent is extended or adjusted under 35 U.S.C. 154(b) by 283 days.

(21) Appl. No.: 18/266,851

(22) PCT Filed: Dec. 16, 2021

(86) PCT No.: PCT/EP2021/086186
§ 371 (c)(1),
(2) Date: Jun. 13, 2023

(87) PCT Pub. No.: WO2022/129328
PCT Pub. Date: Jun. 23, 2022

(65) Prior Publication Data
US 2024/0052963 A1     Feb. 15, 2024

(30) Foreign Application Priority Data

Dec. 17, 2020   (NO) .................................. 20201391

(51) Int. Cl.
*F16L 55/38*     (2006.01)
*F16L 55/26*     (2006.01)
(Continued)

(52) U.S. Cl.
CPC .................................. *F16L 55/38* (2013.01)

(58) Field of Classification Search
CPC . F16L 55/38; F16L 55/30; F16L 55/26; E21B 23/001; B08B 9/055
See application file for complete search history.

(56) References Cited

U.S. PATENT DOCUMENTS

| 4,457,236 A | 7/1984 | Akhmadiev et al. |
| 6,761,233 B1 | 7/2004 | Aadland |

(Continued)

FOREIGN PATENT DOCUMENTS

| CN | 110864187 A * | 3/2020 | ............. F16L 55/28 |
| WO | WO-00/57100 A1 | 9/2000 | |

(Continued)

OTHER PUBLICATIONS

International Search Report and Written Opinion, International Application No. PCT/EP2021/086186, mailed Mar. 31, 2022.

(Continued)

*Primary Examiner* — Laura Martin
*Assistant Examiner* — Anthony W Megna Fuentes
(74) *Attorney, Agent, or Firm* — MARSHALL, GERSTEIN & BORUN LLP (57) ABSTRACT

An apparatus for propulsion and operations inside a cylindrical body, such as a pipeline comprises a central shaft, at least one motor and motor control unit, a number of wheels arranged to rotate round the shaft with a tilted angle, and a sensor module comprising sensors. The position of the wheels with respect to the shaft can be changed by means of an eccentric drive. The wheels are connected to a motor for rotating the wheels, and at least some of the wheels can rotate independent of other wheels.

11 Claims, 8 Drawing Sheets

(51) Int. Cl.
   *B08B 9/055*   (2006.01)
   *E21B 23/00*   (2006.01)
   *F16L 55/30*   (2006.01)

(56) References Cited

U.S. PATENT DOCUMENTS

2012/0043459 A1*  2/2012  Hill .................... E21B 23/08
                                                250/269.4
2019/0345785 A1*  11/2019  Fleckenstein ........... E21B 23/14

FOREIGN PATENT DOCUMENTS

| WO | WO-2009/093915 A1 | 7/2009 |
| WO | WO-2011/010934 A1 | 1/2011 |

OTHER PUBLICATIONS

Search Report, Brazilian Patent Application No. BR112023012028-4, dated Feb. 2, 2025.

* cited by examiner

APPARATUS FOR PROPULSION AND OPERATIONS INSIDE A CYLINDRICAL BODY

BACKGROUND

Globally, water leakage is a huge problem. Due to lack of maintenance and replacement of old pipes, most main water lines in Europe are now 70 to 100 years old, or more.

After time, pipelines often suffer from corrosion of the inner diameter and/or minor cracking and/or leakage. Such pipelines must often be replaced or rehabilitated. Replacement often involves the movement or destruction of above-ground structures, such as roadways or sidewalks. Rehabilitation, on the other hand, may permit a new inner diameter of the pipe to be created using the existing pipeline as an outer shell, which may eliminate the need to dig up large sections of existing pipeline and/or water mains, and which may involve significant cost savings over replacement. The costs associated with identifying where a leak has occurred or are about to occur, and to repair these leakages are significant.

There exist pipe robots for inspecting such pipes, but such equipment is suitable for inspection only, and most of them have poor traction and little or no ability to do work, such as repairs, inside the pipes in addition to the inspection.

NO 320782 describes an apparatus for propulsion in oblong cavities and pipes, such as ducts, drilled or mined holes in rock or wells which are drilled with or without casing in the ground (oil related holes), in metals or other materials. In vertical holes, for example in oil related wells, it is normal to pull the necessary equipment down into the well by means of gravity, if it is not pushed downward by means of a pipe. In horizontal holes or pipes where it is not possible to utilize gravity, an apparatus for pulling or pushing is required for the equipment to be transported. The apparatus can cover a large working area and may operate in ducts having very variable cross section and variable diameter. The apparatus involves a simple design so that different sizes of it may pull/push in holes having diameter ranges of 40 millimeter to several meters.

The apparatus is further designed for automatic adjustment of the pulling force, independent of the design of the cavity. This occurs when a traction, against the action of a spring force, changes its orientation from its maximum angle position relative to the longitudinal axis of the apparatus, and to the position where it is perpendicular to the longitudinal axis. Then the apparatus rotates with the wheels running so the propulsion of the apparatus becomes zero. Thus, if the mass of the tool to be pulled and/or be pushed becomes too large, one avoids the apparatus being exposed to overload.

This system, however, is designed for offshore use, mostly for transporting equipment through oil wells, and is not suitable for inspecting and repairing water pipes.

There is a need for an apparatus for inspecting and repairing pipes, that comprises the following properties:
1. It is controlled from the surface, using a control unit and associated computer equipment.
2. It can be produced in several sizes to meet varying needs.
3. It is relatively small, but with can push and pull with great force.
4. It is robust yet agile enough to maneuver through pipe systems at an angle of up to 90 degrees.
5. It can be combined with fiber optic technology, integrated in the power cable or umbilical of the apparatus.
6. It is compatible with other companies' equipment for data collection, leak identification and remediation of leaks, etc.

These are some of the challenges that the inventive apparatus solves. In addition to carrying inspection equipment, cleaning/flushing equipment, the apparatus can pull heavy equipment, liners, stent etc. for remediation of leaks/damage to pipes, and this requires particularly high traction. It is also a significant point that this invention can generate a high axial traction with small radial point loads on the pipe wall, thereby limiting the loads on the pipe wall.

SUMMARY

The object of the invention is to provide an apparatus for propulsion and operation inside a cylindrical body that solves the problems with prior art and fulfils the needs described above.

The object of the invention is achieved by means of the features of the patent claims.

An apparatus for propulsion and operations inside a cylindrical body, such as a pipeline, comprises in one embodiment a central shaft, at least one motor and motor control unit, a number of wheels arranged to rotate round the shaft with a tilted angle, and a sensor module comprising sensors. The position of the wheels with respect to the shaft can be changed by means of an eccentric drive, the wheels are connected to a motor for rotating the wheels, and at least some of the wheels can rotate independent of other wheels.

The basic principle of the apparatus is that a series of wheels mounted on a shaft is pressed against the pipe wall by means of an eccentric mechanism that can move the wheels out from the center axis of the apparatus. When all wheels are centered on a straight line, the apparatus has its smallest external diameter. The eccentric drive then moves the wheels out from the center line until these press against the pipe wall. Each wheel is tilted relative to the center line and when rotated by the motor, these will undergo a helical movement and thereby "screw" through the tube.

The central shaft can be made in one part or can be made of several parts connected together to form the shaft.

In one embodiment the eccentric drive comprises hydraulic or pneumatic cylinders adapted to cause a radial force on the wheels. The radial force will cause a radial displacement of the wheels. A spring may be provided to provide a counter force to the hydraulic or pneumatic cylinders. In this way, if the force from the hydraulic or pneumatic cylinders is relieved, the spring will bring the wheels to their central position. The spring is in one embodiment a progressive spring.

The apparatus can further comprise at least one cavity for fluid flow to supply the fluid for the hydraulic or pneumatic cylinders.

The wheels can comprise a wheel rim comprising the hydraulic/pneumatic cylinder.

The eccentric drive can comprise tilting means adapted to change the tilting angle of the wheels, thereby controlling the propulsion.

In one embodiment the wheels are arranged in wheel modules where each wheel module comprises at least two wheels and one motor. There may be at least one front wheel module which is arranged in the front section of the apparatus and at least one rear wheel module which is arranged in the rear section, but there may also be more wheel modules. The number of wheel modules and number of wheels in each wheel module can be adapted to the intended use of the apparatus. For example, will a higher number of wheels provide larger propulsion force, which can be useful when travelling longer distances or towing heavy loads. All the wheels in each wheel module rotates in one embodiment simultaneously and the front wheel module and the rear wheel module are controlled individually. For example, can the wheels in the front wheel module rotate in one direction and the wheels in the rear wheel module rotate in a direction counter to the direction of rotation of the front wheel module, thus causing a counterrotation with respect to the wheels in the front wheel module. This causes the wheels of the wheel modules each to travel a helically shaped path with opposite direction. These rotations eliminate each other, preventing rotation of the apparatus itself, as long as the wheels rotates with the same rotational speed and the friction caused by the contact between wheels and pipe wall is equal. The direction and speed of rotation can be controlled by the motor control unit in order to control the movement of the apparatus. For example, by rotating the wheel modules with the same direction of rotation, the apparatus can shift to one side, thus enabling passage of obstructions. The motor control module can also control the direction of movement for the apparatus, so that the apparatus can travel both directions in the pipe.

The apparatus can further comprise an interface module adapted to connect to optional tools. The interface module then comprises connection means for the tools. The interface module can be adapted to be connected to the rear wheel module by means of a connecting device having complimentary parts on the interface module and the rear wheel module. The interface module further comprises connecting means for connecting to tools.

The sensors in the sensor module can be one of or a combination of: gyro meter, accelerometer, inclinometer, and sensor for measuring temperature, humidity, fluid flow.

The motor control unit can be configured to control the motor based on data from the sensors.

BRIEF DESCRIPTION OF THE DRAWINGS

The invention will now be described in more detail by means of examples and by reference to the accompanying figures.

DETAILED DESCRIPTION

Figure 1:
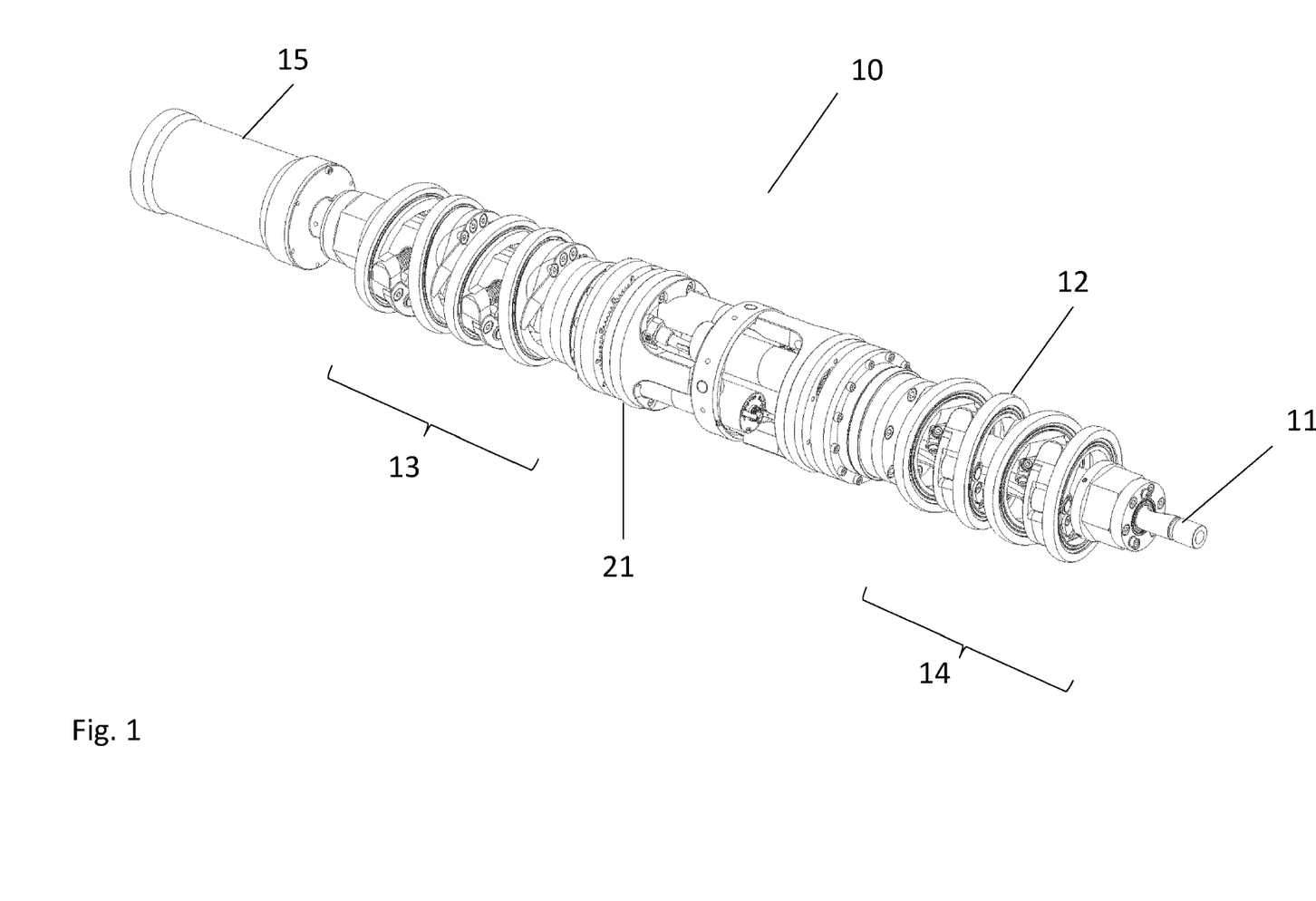
FIG. 1 illustrates an apparatus for propulsion and operations inside a cylindrical body according to the invention.
Figure 2:
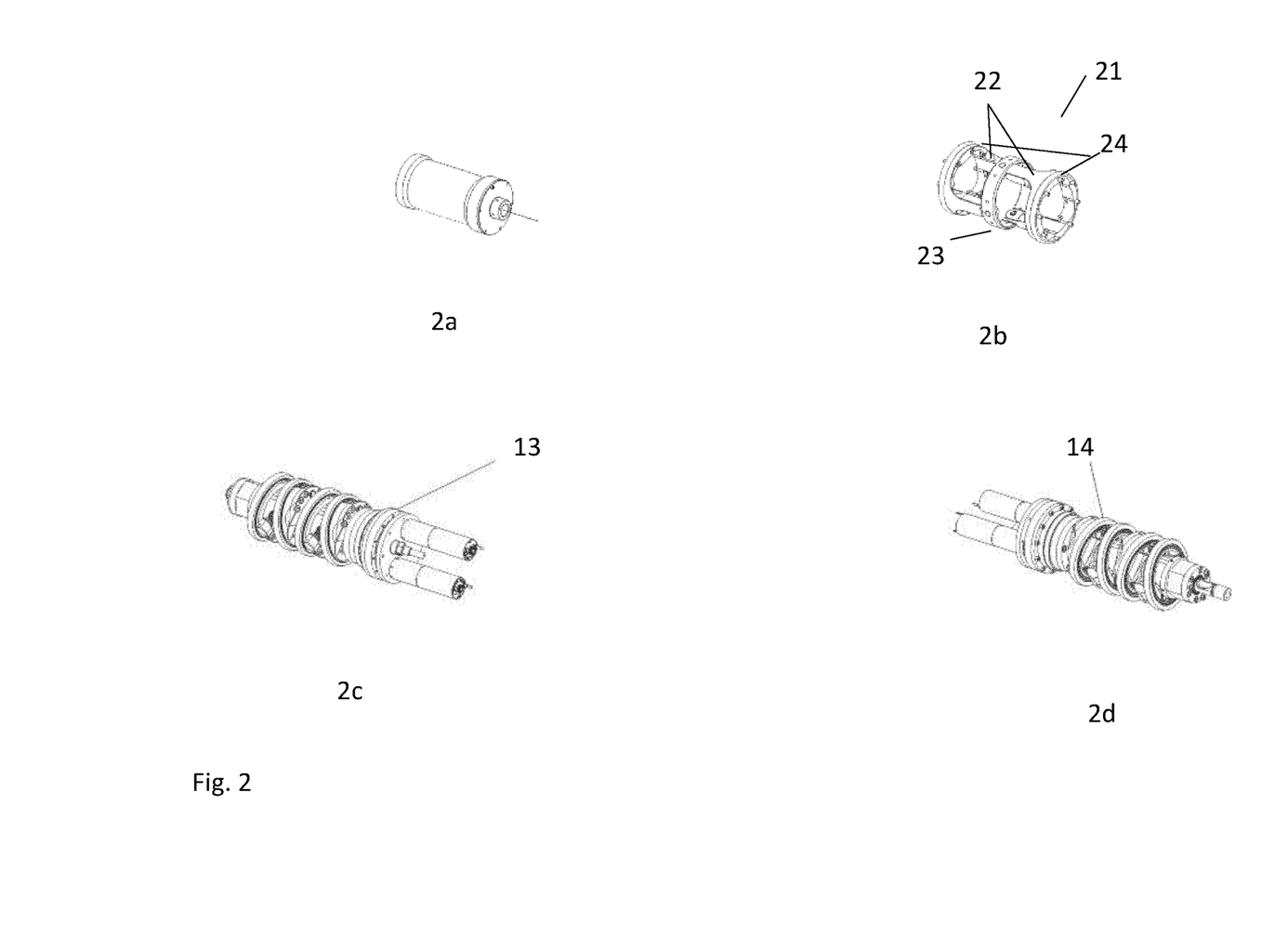
FIG. 2 shows an expanded view of the apparatus of FIG. 1.
Figure 3:
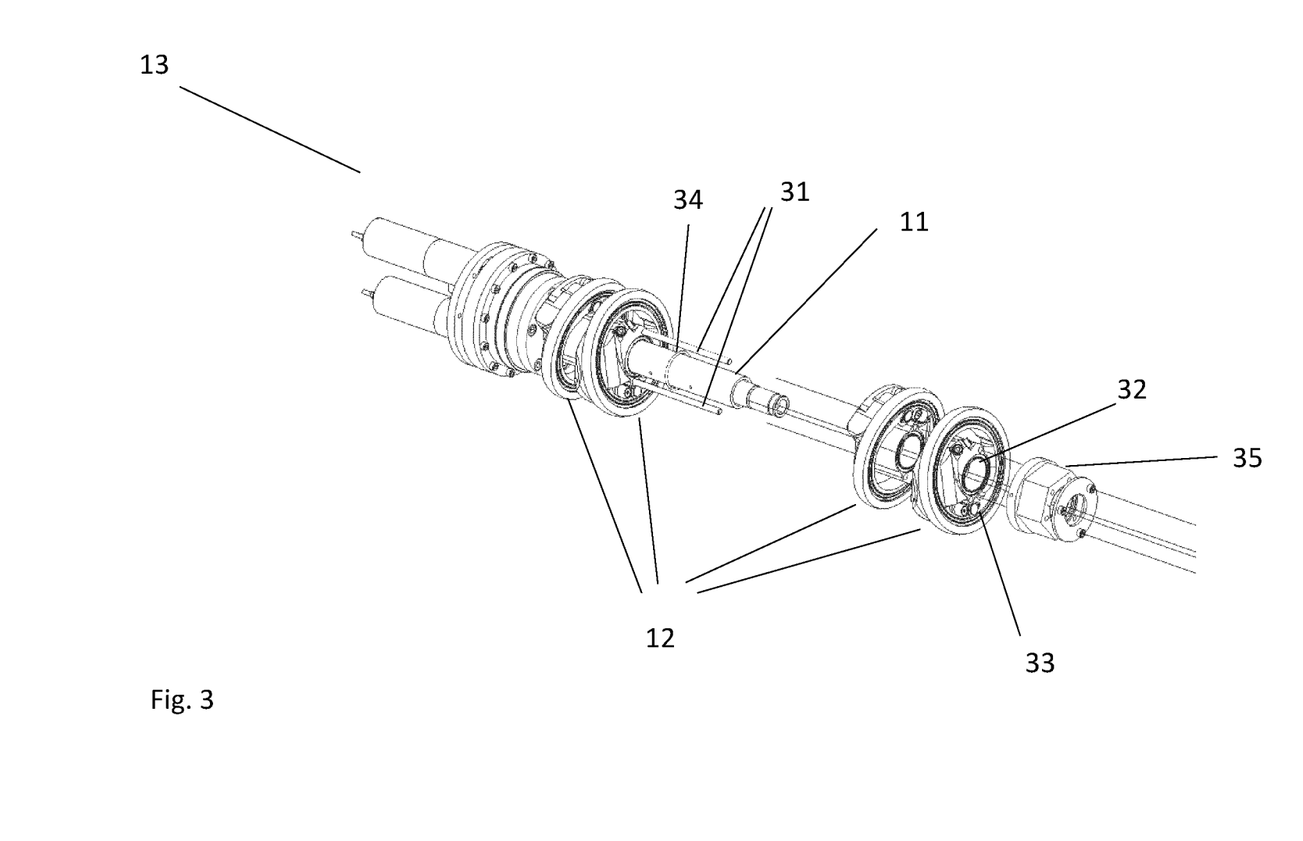
FIG. 3 illustrates the assembly of a wheel module according to the invention.

An overview of an apparatus 10 for propulsion and operations inside a cylindrical body, such as a pipeline is illustrated in FIG. 1. Details of the apparatus of claim 1 is shown in FIGS. 2 and 3. The apparatus comprises a central shaft 11 extending through at least parts of the apparatus 10. The central shaft can be made in one part or can be made of several parts connected together to form the shaft. In the example of FIGS. 1 and 2, the shaft is made by assembling four modules, which are illustrated in FIG. 2*a-d* and will be described later.

The apparatus further comprises several wheels 12 arranged to rotate round the shaft 11 with a tilted angle. The position of the wheels 12 relative to the shaft 11 can be changed by means of an eccentric drive which is configured to move the wheels in a radial direction relative to the shaft to achieve an eccentric state with respect to the shaft 11 and the center axis of the apparatus. The eccentric drive or other means can also comprise tilting means which can be used to change the tilting angle of the wheels. Changing the tilting angle of the wheels will change the propulsion of the apparatus, and thus controlling the tilting angle will enable control of the propulsion of the apparatus.

The wheels 12 are connected to a motor for rotating the wheels. At least some of the wheels 12 can rotate independent of other wheels. In FIG. 1 there is illustrated an example with eight wheels, where the wheels are arranged in two wheel modules, a front wheel module 13 and a rear wheel module 14, each comprising four wheels. The wheels in the two wheel modules are arranged in a tilted position, where the wheels in the front wheel module tilts with opposite angle of the wheels in the rear wheel module. In other configurations the wheels in the two wheel modules may have other angles. The two wheel modules are illustrated separately in FIGS. 2*c* (front module) and 2*d* (rear module) Each module also comprises at least one motor for rotating the wheels.

The front wheel module 13 is arranged in the front section of the apparatus and at the rear wheel module 14 is arranged in the rear section. In one configuration, all the wheels in each wheel module rotates simultaneously and the front wheel module and the rear wheel module are controlled individually. During use, the four wheels in the front module then can rotate in with the same speed of rotation and direction of rotation, while the four wheels in the rear wheel module can rotate with a speed of rotation and direction rotation that is different from the wheels of the front wheel module, but equal for all the wheels in the rear wheel module. It is of course also possible that the two wheel modules rotates with same speed and direction.

The eccentric drive can comprise hydraulic/pneumatic cylinders for providing hydraulic/pneumatic force to move the wheels radially relative to the shaft. The hydraulic/pneumatic cylinders are driven by hydraulic fluid/air, which can be provided for example by means of a cavity for fluid flow running along the central shaft or a fluid hose running along the central part of the apparatus. There can be arranged cavities in each wheel module, and a fluid hose connecting the cavities. The cavities/fluid hose are in fluid communication with the hydraulic/pneumatic cylinders.

The apparatus can also comprise signal and/or power cables. There can be provided a separate cavity for this purpose.

The apparatus can be powered by an external power source or can comprise a power source. When the power source is external, the apparatus is connected to the power source by a power cable. There may also be other cables connected to the apparatus, for example for signal transfer, in order to send control signals to the apparatus from a remote location.

FIG. 3 illustrates the assembly process for a front wheel module 13. The wheels 12 have a central opening 32 and are inserted onto the shaft 11. Two guiding pins 31 are arranged parallel to the shaft and fits into complimentary guiding holes 33 in the wheel 12, thus ensuring correct orientation and positioning of the wheels on the shaft. Suitable spacers 34 are arranged between the wheels to provide the correct distance between the wheels. The spacers may be gaskets or other kinds of sealing device. When all wheels 12 have been mounted onto the shaft 11, a nut 35 is mounted at the end, to seal off the shaft and hold the components in place.

The two wheel modules are connected by means of a universal joint 21, illustrated in FIG. 2*b*. The universal joint comprises in this embodiment three main components; two "forks" 22 and one center ring 23. These parts are connected for example by means of bolts. The universal joint provides a flexible joining of the wheel modules. This makes the apparatus somewhat flexible, which can be useful when maneuvering long pipes with curves. The parts are machined to provide an angle limitation on the joint. In addition, on the end sections of the "forks", there are arranged recesses for receiving plastic rings 24 that have as purpose to contact the pipe wall before the remaining parts of the joint. The "forks" 22 are mounted directly on to the end of the wheel modules 13, 14, thus locking the rings 24 in place. The motors for the wheel modules can be placed inside the universal joint.

The rotation of the wheels can be controlled by a motor control unit comprised in the apparatus and connected to the motor/motors. The rotation of the wheels can be provided by rotating a rotor shaft onto which all the wheels in the same wheel module are connected, or each wheel can be rotated individually. The embodiment with rotor shaft will ensure that all wheels in the same module is rotated equally and coordinated.

The apparatus further comprises a sensor module 15 which is shown in FIG. 2*a*. the sensor module is connected to the front wheel module 14 and comprises at least one sensor for sensing properties of the ambience surrounding the apparatus or experienced by the apparatus. The sensor module can for example comprise sensors for monitoring orientation of the apparatus and/or the wheels, such as gyro meter, accelerometer, inclinometer, etc. Other sensors that can be comprised in the sensor module can be sensors for measuring temperature, humidity, fluid flow, etc.

Figure 4:
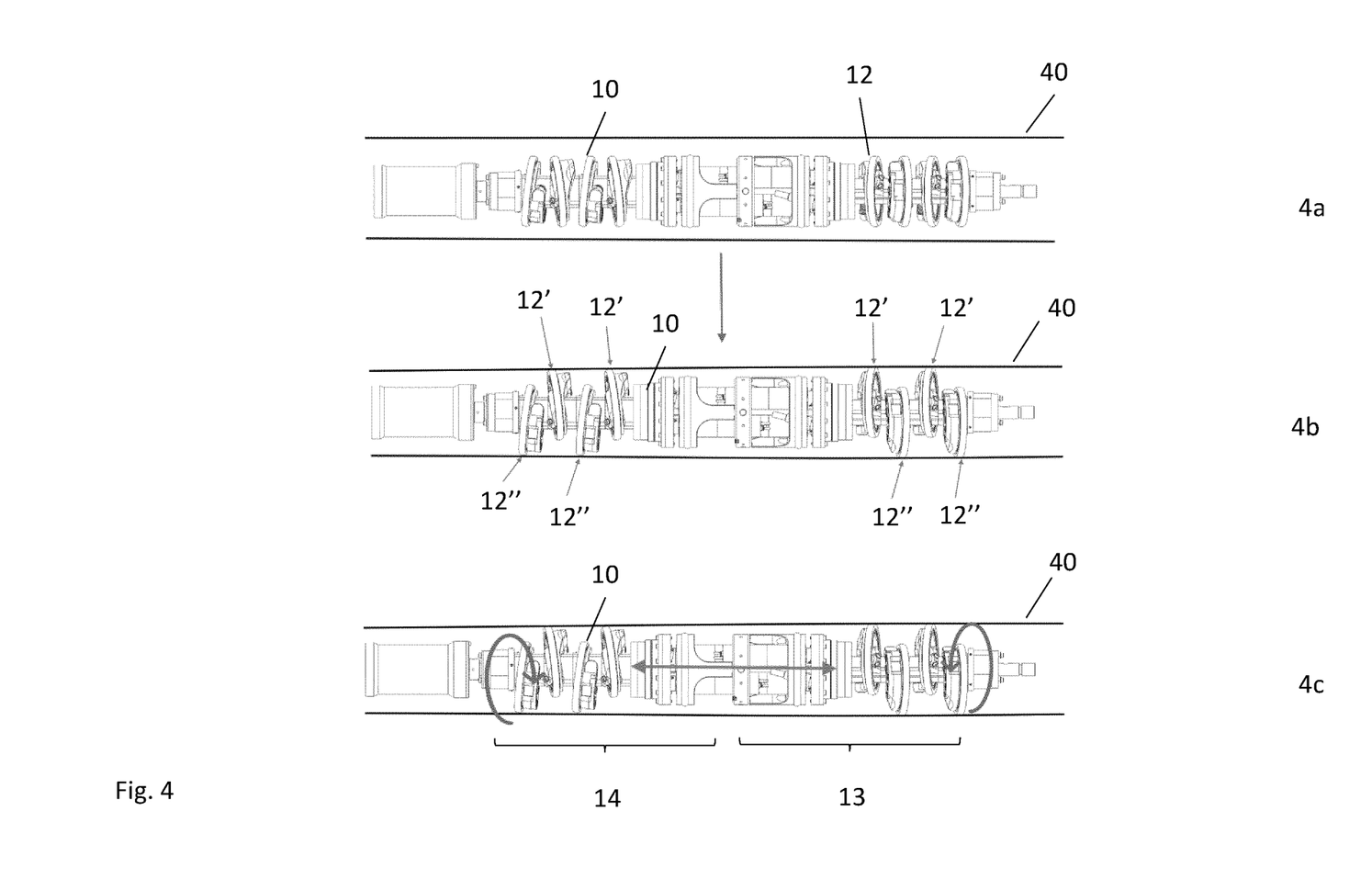
FIGS. 4 and 5 illustrates the operation of an apparatus according to the invention.

FIG. 4 illustrates the operation of the apparatus 10 in FIG. 1 in a pipe 40. In FIG. 4*a* the apparatus 10 is inserted into a pipe 40 with all the wheels in a centered position. In this configuration, the apparatus is stationary, and the diameter of the apparatus is smallest possible, thus providing space around the apparatus 12 in the pipe 40. In FIG. 4*b*, the eccentric drive has been activated to move the wheels 12 out of the initial position to an eccentric position relative to the center axis of the apparatus. As can be seen in the figure, some of the wheels 12' have been moved upwards, while other wheels 12" have been moved downwards. The wheels can be moved in any radial direction. The wheels have been moved so far as to come into contact with the inner wall of the pipe 40 and to press towards the inner wall of the pipe 40 with some force. This contact/pressure will cause friction between the wheels and the pipe wall, which enables movement when the wheels are rotated.

In FIG. 4*c* the wheels rotates, thus providing movement along the length of the pipe due to the tilted orientation of the wheels. The wheels of the front wheel module rotates with a counter rotation with respect to the wheels of the rear wheel module. This causes the wheels of the wheel modules each to travel a helically shaped path with opposite direction. These rotations eliminate each other, preventing rotation of the apparatus itself, as long as the wheels rotates with the same rotational speed and the friction caused by the contact between wheels and pipe wall is equal. Sensors in the sensor module 15 can monitor the movement and orientation and the motor control unit can control the motor to compensate for any differences and keep the apparatus in the desired orientation during the travel through the pipe. Reversing the direction of rotation will cause the apparatus to move in the opposite direction.

Figure 5:
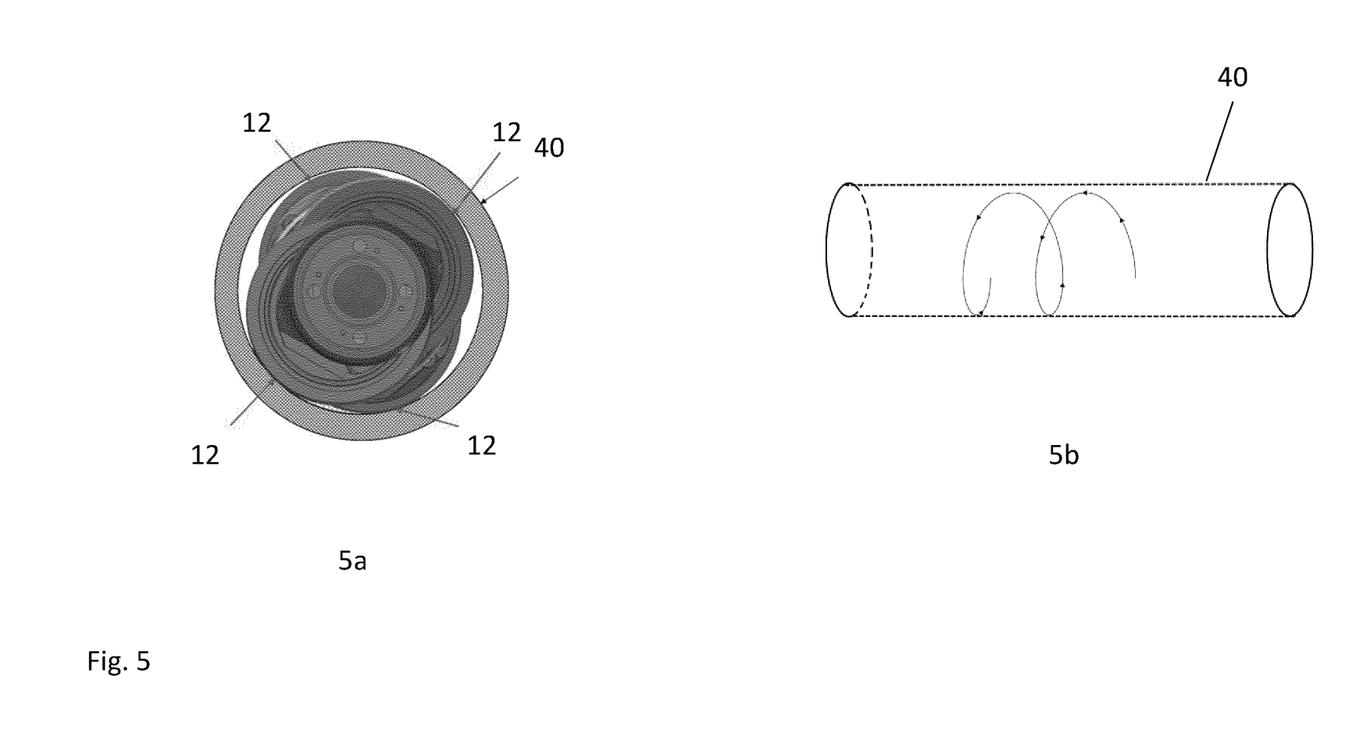

FIG. 5 further illustrates the movement of the wheels 12 and the resulting path in the pipe 40 traveled by the wheels. In FIG. 5*a* the wheels 12 have been displaced radially to obtain an eccentric position where they are in contact with the inner wall of the pipe 40. In FIG. 5*b* the helical movement of the contact points of the wheels against the pipe wall is illustrated.

Figure 6:
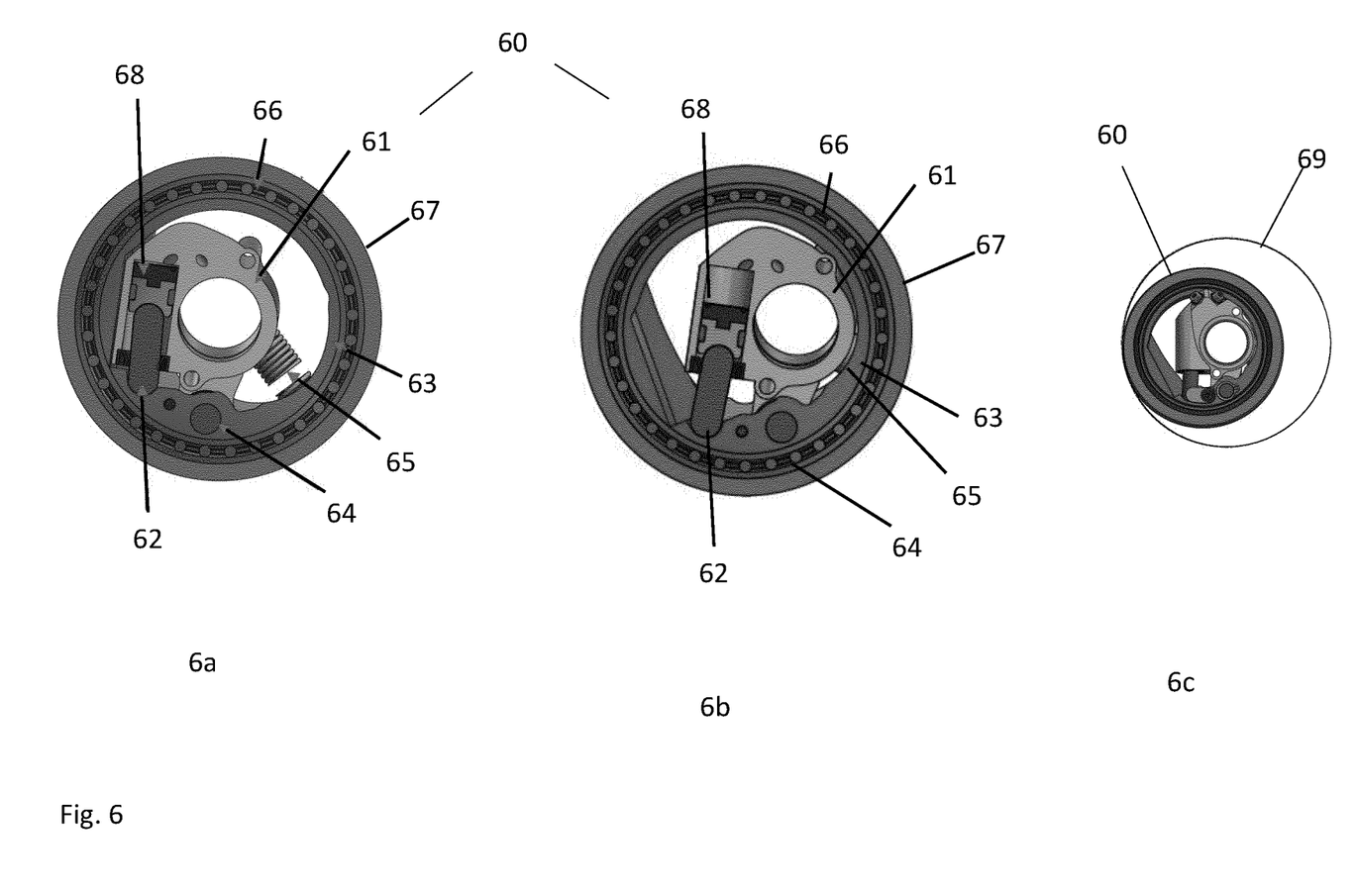
FIGS. 6 and 7 shows an example of a wheel for use in an apparatus according to the invention.
Figure 7:
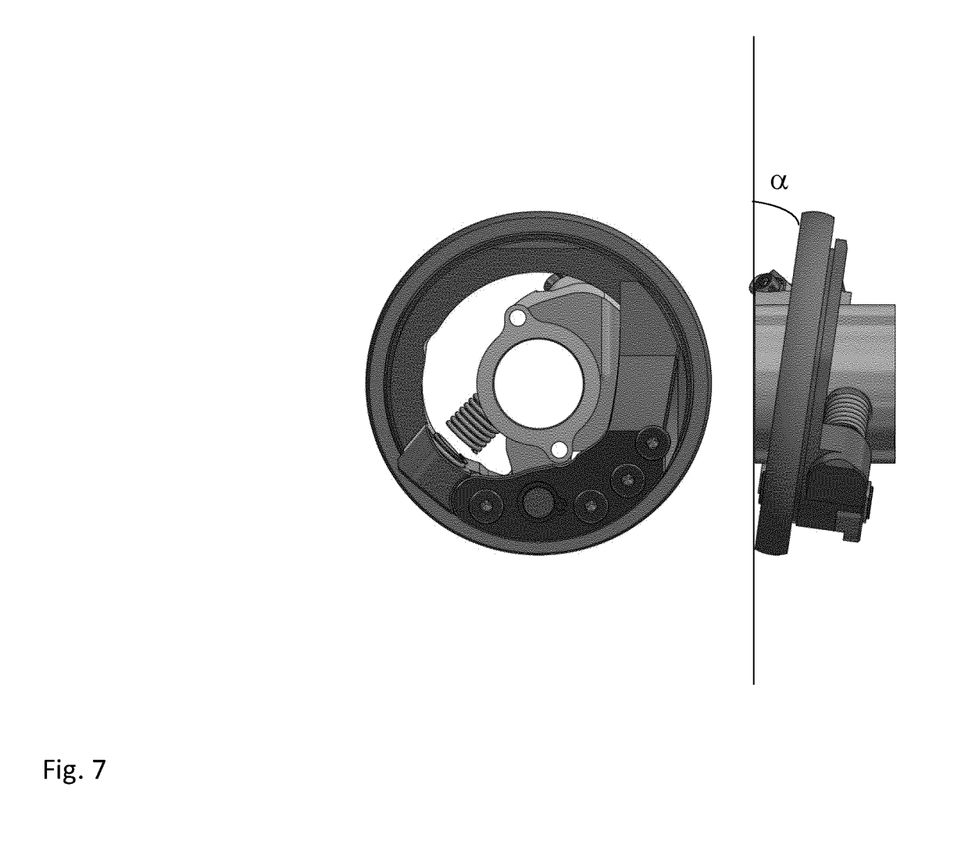

FIGS. 6 and 7 illustrates the wheels and the eccentric movement of the wheels.

Each wheel 60 comprises mainly a hub 61 with hydraulic/pneumatic cylinder 62, 68, a rim 63, a rotary bolt 64, spring 65, bearing 66 and "tire"/friction surface 67. The following example uses a hydraulic cylinder. The hydraulic/pneumatic cylinder and piston 62, 68 provides a force that moves the wheel to an eccentric position, while the spring 65 provide a counterforce to the hydraulic force exerted by the hydraulic cylinder.

When the apparatus is inserted into a pipe, the hydraulic cylinder is 62, 68 is typically initially arranged in the innermost position, illustrated in FIG. 6*a*, and the rim is approximately concentric with the center hole in the hub. When the pressure increases in the hydraulic cylinder, the plunger 68 will push the cylinder rod 62 out and the rim 63 will rotate about the rotary bolt 64 so that these will now become eccentric, as illustrated in FIGS. 6*b* and 6*c*. Then the "tire" 67 will push against the inside of the pipe 69, as illustrated in FIG. 6*c*, and create a friction connection. Between the rim 63 and the "tire" 67 there is a bearing 66 that allows the "tire" to rotate freely on the rim during the displacement. When the pressure from the hydraulic fluid is reduced or removed, the spring 65 returns the plunger so that the rim will again be approximately concentric with the hub.

In addition to the return function that the spring 65 provides, the interaction between the springs of the wheels contacting and pushing on opposite sides of the pipe will also assist centering of the apparatus in the tube. This centering can be improved by using progressive springs, but the solution is not limited to this.

FIG. 7 shows a rear view and side view of the wheel illustrated in FIG. 6. In the side view, the tilt of the wheel is evident. In this example the tilt angle $\alpha$ is 8 degrees but is not limited to this.

Figure 8:
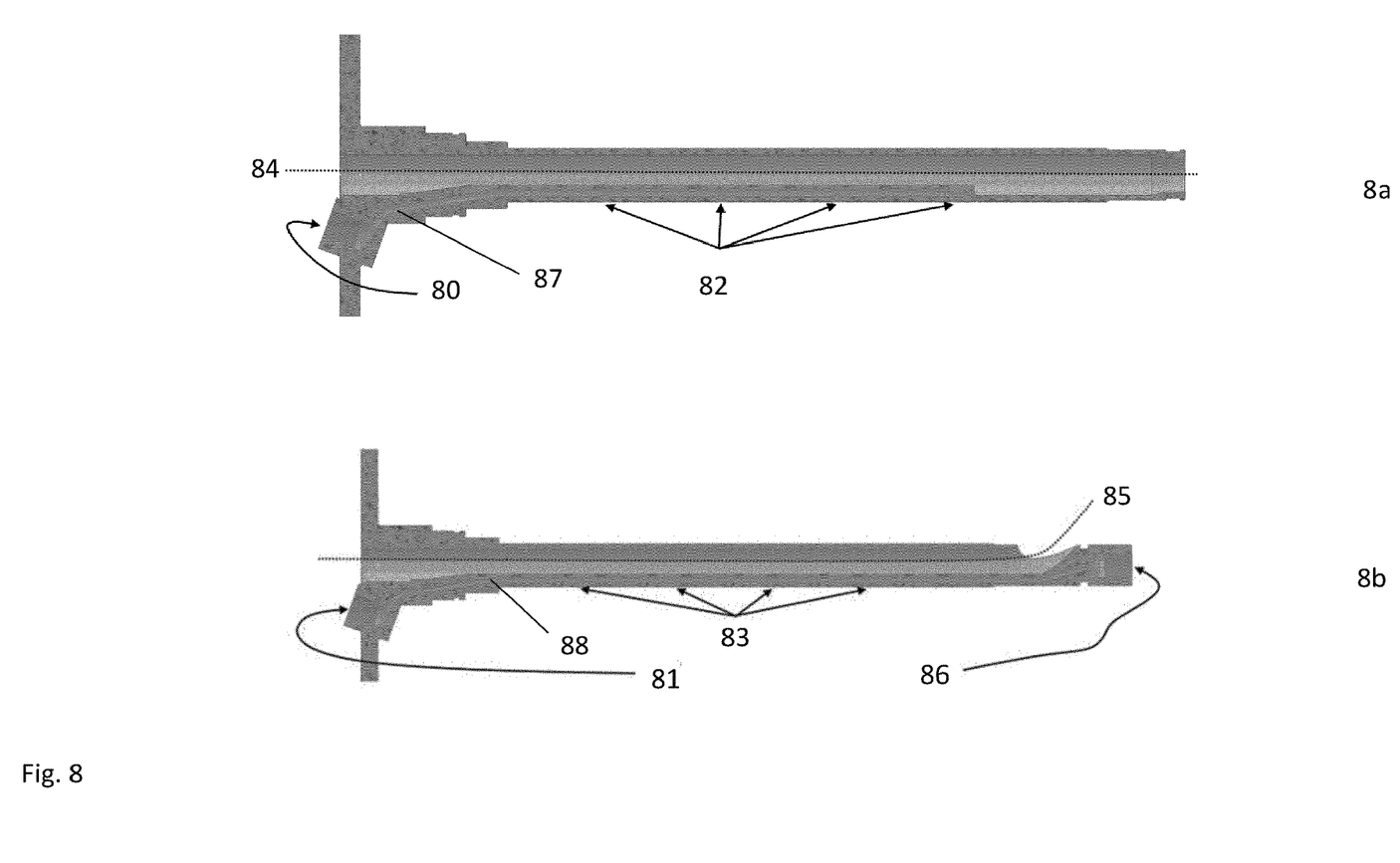
FIG. 8 illustrates the shafts of a front wheel module and rear wheel module.

FIG. 8 illustrates the shafts of a front wheel module (FIG. 8*a*) and rear wheel module (FIG. 8*b*). The shafts comprise cavities for hydraulic/pneumatic fluid 87, 88 and for signal and/or power cables 84, 85. The fluid cavity of the rear wheel module extends through the full length of the shaft and comprises connections 81, 86 for connecting to fluid hoses or other hydraulic equipment. Both shafts comprise openings 82, 83 for supplying fluid to the eccentric drive for moving the wheels relative to the shaft as described above.

The invention claimed is:

1. Apparatus for propulsion and operations inside a cylindrical body, such as a pipeline, comprising:
    a central shaft,
    at least one motor and motor control unit,
    a number of wheels arranged to rotate round the shaft with a tilted angle, where the position of the wheels with respect to the shaft are changed by means of an eccentric drive, the wheels are connected to a motor for rotating the wheels, and at least some of the wheels can rotate independent of other wheels,
    wherein each wheel comprises a rim and a hub with a hydraulic or pneumatic cylinder, wherein when the hydraulic or pneumatic cylinder is arranged in an innermost position, the rim is approximately concentric with a center hole in the hub, and wherein when pressure increases in the hydraulic or pneumatic cylinder, the rim is adapted to become eccentric relative to the center hole in the hub, and where the apparatus further comprises a sensor module comprising sensors.

2. The apparatus according to claim 1, comprising a cavity for fluid flow and where the hydraulic or pneumatic cylinders is adapted to cause a radial force on the wheels and a spring providing a counter force to the hydraulic or pneumatic cylinders.

3. The apparatus according to claim 2, where the spring is a progressive spring.

4. The apparatus according to claim 1, where the eccentric drive is capable of changing the tilting angle of the wheels, thereby controlling the propulsion.

5. The apparatus according to claim 1, where the wheels are arranged in wheel modules where each wheel module comprises at least two wheels and one motor.

6. The apparatus according to claim 5, where at least one front wheel module is arranged in a front section of the apparatus and at least one rear wheel module is arranged in a rear section, where all the wheels in each wheel module rotates simultaneously and where the front wheel module and the rear wheel module are controlled individually.

7. The apparatus according to claim 6, where the wheels in the front wheel module rotate in one direction and the wheels in the rear wheel module rotate in a counterrotation with respect to the wheels in the front wheel module.

8. The apparatus according to claim 1, further comprising an interface module adapted to connect to tools, where the interface module comprises connection means for the tools.

9. The apparatus according to claim 1, where the sensors are one of or a combination of: gyro meter, accelerometer, inclinometer, and sensor for measuring temperature, humidity, and/or fluid flow.

10. The apparatus according to claim 1, where the motor control unit is configured to control the motor based on data from the sensors.

11. Apparatus for propulsion and operations inside a cylindrical body, such as a pipeline, comprising: a central shaft, at least one motor and motor control unit, a number of wheels arranged to rotate round the shaft with a tilted angle, whereby when a respective center of all wheels are centered on a straight center line of the apparatus, the apparatus has its smallest external diameter, where the position of the wheels with respect to the shaft are changed by means of an eccentric drive moving the wheels out from the straight center line of the apparatus, the wheels are connected to a motor for rotating the wheels, and at least some of the wheels can rotate independent of other wheels, and where the apparatus further comprises a sensor module comprising sensors.

\* \* \* \* \*